United States Patent [19]

Pensoneau

[11] Patent Number: 5,230,587
[45] Date of Patent: Jul. 27, 1993

[54] METHOD AND APPARATUS FOR DEPOSITING A LAYER OF AGGREGATE MATERIAL

[75] Inventor: Gary E. Pensoneau, St. Clair County, Ill.

[73] Assignee: Judy W. Pensoneau, Belleville, Ill.; a part interest

[21] Appl. No.: 766,023

[22] Filed: Sep. 26, 1991

[51] Int. Cl.⁵ ............................................. B09B 1/00
[52] U.S. Cl. ................................. 405/129; 405/1; 405/258; 405/303
[58] Field of Search ............ 405/128, 129, 117, 116, 405/258, 270

[56] References Cited

U.S. PATENT DOCUMENTS

| | | | |
|---|---|---|---|
| 1,980,634 | 11/1934 | Philips | 405/117 |
| 2,040,022 | 5/1936 | Philips | 405/117 |
| 3,253,416 | 5/1966 | Madison | 405/117 |
| 3,586,624 | 6/1971 | Larson | 405/129 X |
| 4,352,601 | 10/1982 | Valiga et al. | 405/128 X |
| 4,374,672 | 2/1983 | Funston et al. | 405/129 X |
| 4,653,961 | 3/1987 | Hashimoto | 405/117 X |

OTHER PUBLICATIONS

Rex Chainbelt Inc.–"Components and Products for Power Transmission and Material Handling"–1969, pp. 658 & 659.

Primary Examiner—Dennis L. Taylor
Attorney, Agent, or Firm—Polster, Lieder, Woodruff & Lucchesi

[57] ABSTRACT

A method and apparatus for depositing a layer of aggregate material over a large area of land, for example, in preparing a new land fill waste-disposal site. An elongated, endless-belt conveyor is positioned across the width of the site and is supported upon a plurality of longitudinally spaced tractor units which are adapted to move the entire conveyor laterally across the length of the site. Aggregate material is supplied to one end of the conveyor and is conveyed toward the opposite end thereof. A mobile discharge unit through which the endless-belt passes, is moveable longitudinally along the conveyor to discharge the aggregate from the endless belt continuously as the discharge unit travels between the ends of the conveyor. The discharged material is continuously conveyed laterally away from the conveyor, deposited upon a portion of the site and spread along a strip of the land area laterally adjacent to the conveyor. After the strip has been covered with aggregate adjacent the conveyor along the entire width of the site, the tractor units move the entire conveyor laterally over the finished strip, and the process is repeated until the entire site is covered.

18 Claims, 2 Drawing Sheets

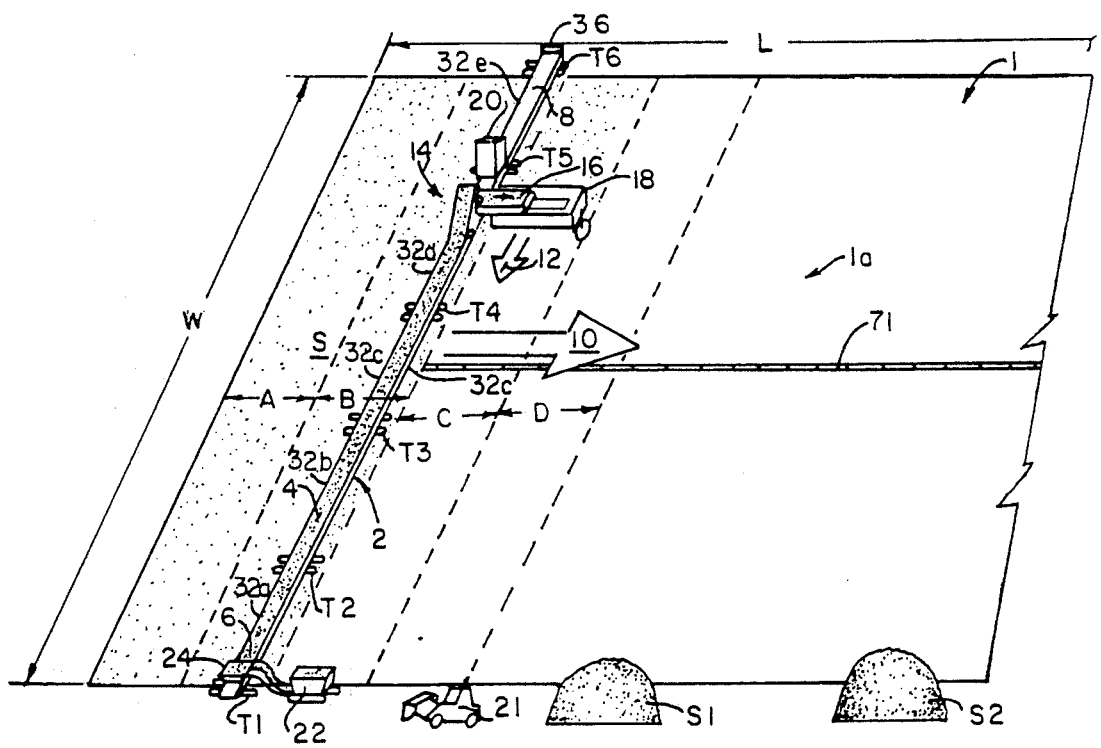
FIG. 1.
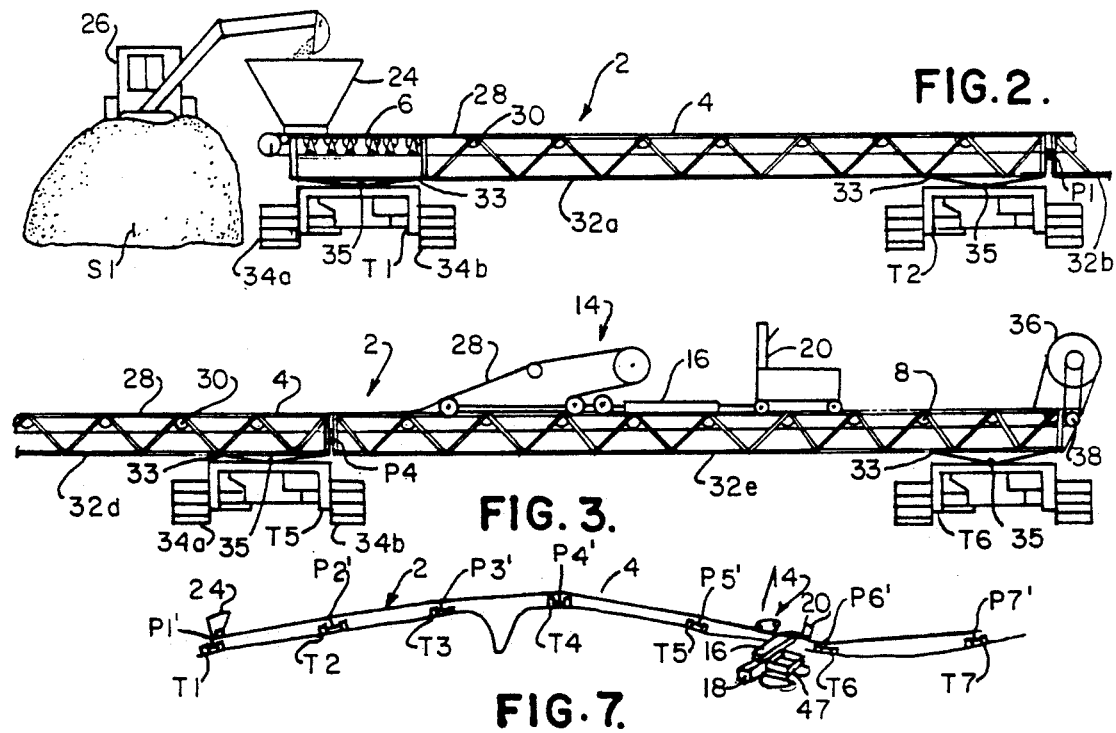
FIG. 2.
FIG. 3.
FIG. 7.

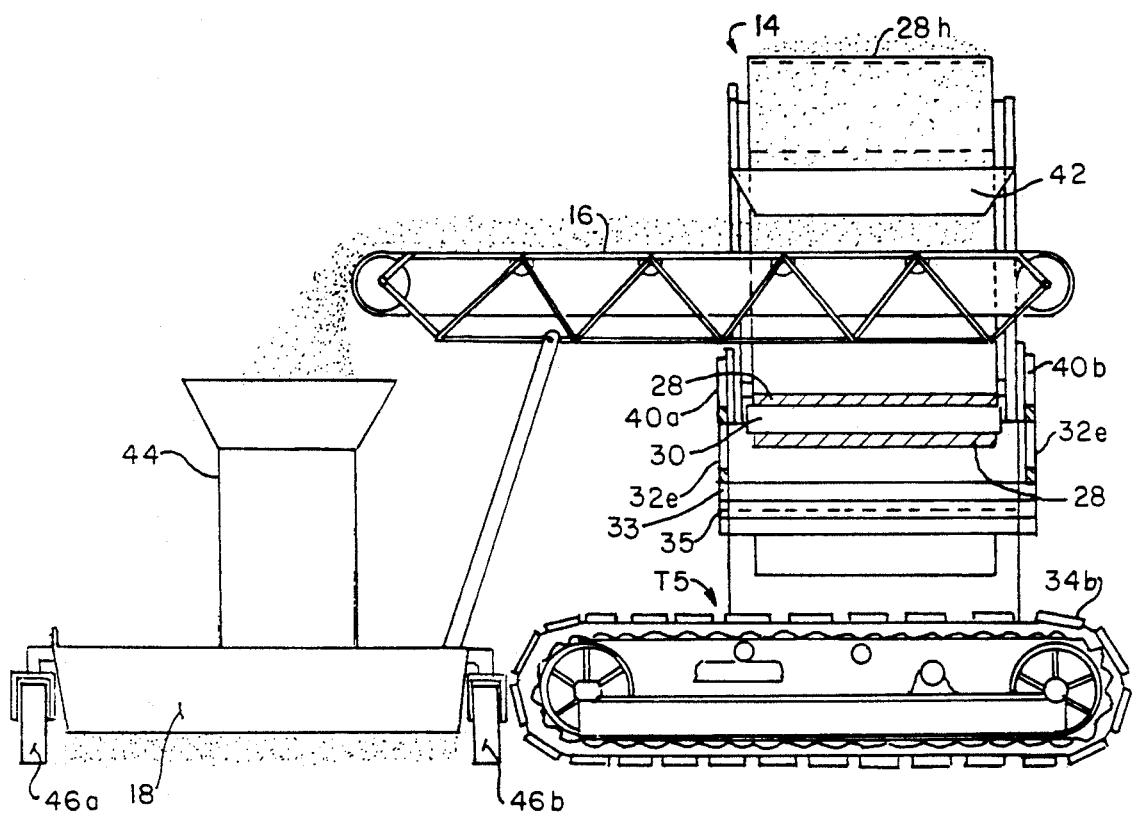
FIG. 4.
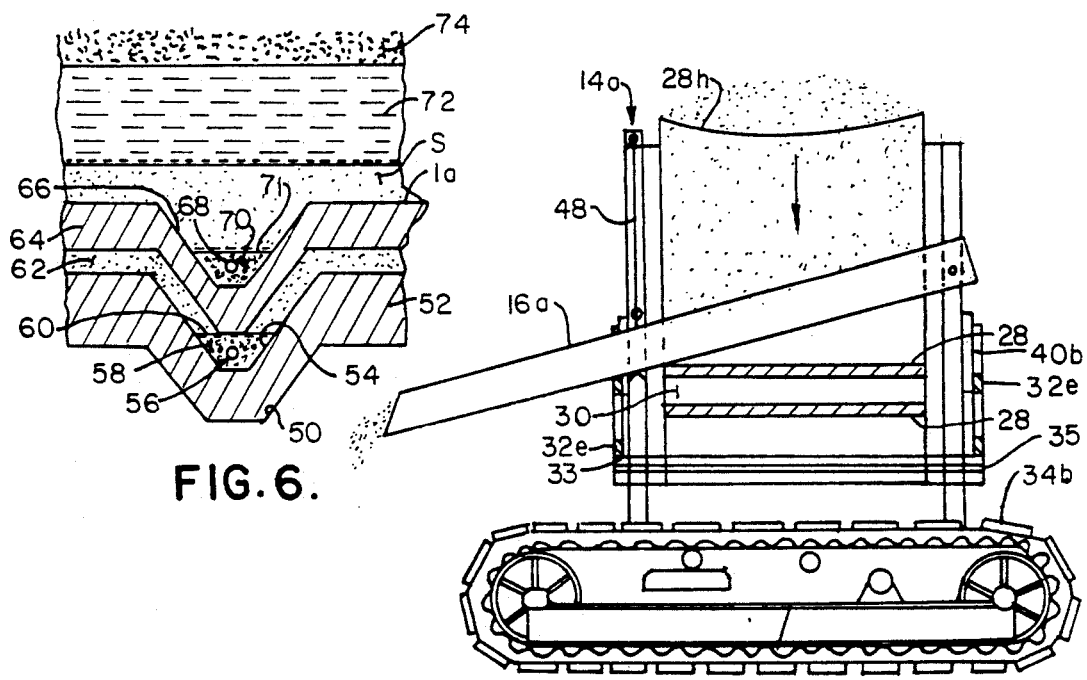
FIG. 6.
FIG. 5.

METHOD AND APPARATUS FOR DEPOSITING A LAYER OF AGGREGATE MATERIAL

BACKGROUND OF THE INVENTION

The invention relates to a method and apparatus for depositing a layer of aggregate material of approximately consistent depth over a large area of land. While the invention may be utilized in laying down a layer of sand or gravel for constructing a large parking lot or other large construction site in an economical manner, the invention has particular utility and provides particular advantages in preparing a new land fill waste-disposal site economically and in an environmentally responsible manner. Other applications for the present invention may be found in any task where aggregate material is to be deposited over a site containing areas which must not be subjected to heavy loads or where features of the terrain such as deep ditches or the like must be spanned or otherwise dealt with. Another possible application is surface mine reclamation where large quantities of aggregate material such as soil materials must be spread over a large area economically.

In the case of preparing a large area of land for a new land fill waste-disposal site, it is common to deposit over the entire site a first layer of sealing clay, then a layer of sand, another layer of clay and over these deposited layers the entire site is covered with a plastic liner of, for example, high-density polyethylene to prevent as much as possible liquids from the waste from leaching into the land and possibly contaminating underground water. Over the plastic liner a leachate collection system is located consisting of perforated plastic pipe immediately surrounded by a filter fabric and rock. The land is graded so that liquid will flow over the plastic liner to the leachate collection system where it is collected and properly disposed of. It is then conventional to deposit a layer of sand of about twelve to about eighteen inches in depth over the entire plastic liner and leachate collection system and thus over the entire land fill site. Conventional methods of laying down a layer of aggregate such as the sand are not well suited to this job. For example, a loaded dump truck moving across the plastic while depositing a trailing stream of sand can be quite destructive to the plastic liner. Even if the dump truck were to back over the sand as it is deposited from the rear of the truck, the massive weight of the truck may present problems to the integrity of the plastic liner and a slight detour from the proper path would lead the truck directly onto the liner.

Another conventional method is to dump the sand at the edge of the site and have a bull dozer spread the sand over the liner such that the dozer always tracks over sand which it has pushed ahead and spread. This method is disadvantageous in that it is very difficult to economically produce a layer of sand of consistent depth and the heavy equipment required, and the number of passes required, increase the probability of plastic liner and leachate collection system degradation. Also the great weight of the sand piles initially being shifted across areas of the liner may cause tearing of the liner. A great degree of operator skill would also be necessary. Further, in order to perform the conventional methods using large dump trucks and bulldozers, large numbers of expensive man-hours must be expended as well as the use of large numbers of very expensive heavy machinery. Due to the large number of men and machines used in conventional methods scheduling of truck arrivals and equipment usage can be an extremely important part of the job causing heightened probabilities of down time and wasted machine-hours and man-hours. As compared to the present invention, conventional methods may also use a greater amount of fuel.

SUMMARY OF THE INVENTION

It is therefore an object of the invention to provide an improved method for depositing a layer of aggregate material over a large area which is more economical.

It is another object of the invention to provide a method for depositing a layer of aggregate material more evenly and with improved accuracy of depth and thus with associated savings of aggregate material and the costs associated therewith.

It is still another object of the invention to provide a method for depositing a layer of aggregate material which is less likely to cause damage to or crush a material or structure over which the layer of aggregate material is to be deposited.

It is a still further object of the invention to provide an improved apparatus for depositing a layer of aggregate material over an area which is more economical, spreads aggregate more evenly and to a more accurate depth in less time, and is less likely to damage, crush or compact a material over which the layer of aggregate material is to be deposited.

Generally speaking, the apparatus according to the present invention comprises an elongated conveyor having a proximate end portion for receiving aggregate material and a distal end portion toward which the material is conveyed. The conveyor is carried by a plurality of relatively light tractor units spaced beneath the conveyor and which may be actuated in unison or individually for selectively moving the conveyor in a lateral direction. A mobile discharge unit travels selectively between the end portions of the conveyor to discharge the aggregate material from the conveyor at any point along the conveyor and continuously as the discharge unit travels between the conveyor end portions. A depositing unit moves with the mobile discharge unit to receive aggregate discharged from the conveyor, conveys the material laterally, and deposits the aggregate in a strip adjacent the elongated conveyor. A spreading unit may be attached to the depositing unit to automatically spread the aggregate to the finished depth or, alternatively, a small separate bladed vehicle may be utilized to finish spreading the deposited strip.

In summary, the novel method of the present invention includes the steps of supplying aggregate material to one end portion of an elongated conveyor; conveying the material along the conveyor; discharging the material from the conveyor continuously from variable locations along the length of the conveyor; depositing and spreading the material upon an area strip adjacent the conveyor; moving the conveyor laterally over the area strip; and repeating the process until the entire area is covered.

These as well as other objects and advantages of the present invention will become more apparent upon a reading of the following detailed description of the preferred embodiments in conjunction with the drawings wherein:

BRIEF DESCRIPTION OF THE DRAWINGS:

FIG. 1 is a schematic perspective representation of an area upon which a layer of aggregate material is to be deposited and depicts the method of the present invention and one preferred embodiment of the novel apparatus which employs the method;

FIG. 2 is schematic side elevational view of the feed end of a conveyor which can be utilized to perform the method of the present invention showing an alternative feed apparatus;

FIG. 3 is a schematic side elevational view of the belt return end of the conveyor of FIG. 2 showing a conveyor mobile discharge unit which can be utilized to perform the method of the present invention;

FIG. 4 is a schematic rear view of the mobile discharge and depositing units;;

FIG. 5 is a schematic rear view similar to FIG. 4 except showing an alternative depositing unit;

FIG. 6 is a cross sectional diagramatic view of the layers utilized in preparing a new solid waste landfill site; and FIG. 7 is a schematic representation of the conveyor system showing that the system may be utilized on irregular terrain.

DETAILED DESCRIPTION OF THE PREFERRED EMBODIMENTS

With reference to the drawings, and FIG. 1 in particular, there is depicted a method for depositing a layer of aggregate material over a large area of land. For illustrative purposes, FIG. 1 shows a new land fill site generally indicated by reference numeral 1. Land fill site 1 may be virtually any size; however, for purposes of this description an area of land having a width of about three hundred feet wide is depicted. The length L of the area need not be limited and may extend, for example, one thousand feet. Land fill site 1 is shown in the process of having a layer of sand S approximately evenly distributed over a liquid impermeable liner 1a by mobile conveyor system 2 constructed in accordance with the principles of the present invention. Conveyor system 2 comprises a motor driven elongated, endless-belt conveyor 4 having a proximate end portion for receiving aggregate material, in this case sand, and a distal end portion 8 toward which the sand is conveyed. Conveyor is supported upon a plurality of remotely controlled, individually actuatable, electric motor driven tractor units T1, T2, T3, T4, T5 and T6, which are adapted to transport the entire conveyor system 1 in the lateral direction shown by the large arrow 10. Also supported by tractor units T1–T6 and riding longitudinally along the frame of conveyor 4 in the direction of smaller arrow 12 is a mobile discharge unit 14, also known in the art as a belt conveyor tripper. Mobile discharge unit 14 is adapted to raise the level of conveyor belt 4 and the sand thereon and discharge or dump the sand onto a second laterally disposed endless-belt conveyor 16 affixed to discharge unit 14. Conveyor 16 conveys the sand laterally to deposit the sand from discharge unit 14 to an area of site 1 laterally adjacent conveyor 4. In the embodiment shown in FIG. 1, lateral deposit conveyor 16 unloads sand off the end thereof into a mobile sand spreader 18 attached to discharge unit 14 to evenly spread the sand to a desired depth over the area laterally adjacent to conveyor 4. Discharge unit 14 also carries therewith control center 20 adapted to safely convey the human operator of system 2. From control center 20, the operator can control the operation of belt conveyor 4, discharge unit 14, belt conveyor 16, spreader 18, mobile hopper 22, and tractor units T1–T6. The tractor units T1–T6 can be actuated either in unison or individually.

In the embodiment shown in FIG. 1, sand is stockpiled in mounds S1, S2, etc., spaced outside the proximate length line of site 1. A mobile loader 21 conveys loads of sand from mounds S1, S2, etc., to mobile hopper 22 where the sand is conveyed upward into feed hopper 24 affixed to the frame of conveyor 4. Feed hopper 24 meters the flow of sand onto the receiving end portion 6 of endless-belt conveyor 4.

The method according to the present invention represented in FIG. 1 is as follows. Initially conveyor system 2 is assembled along the width of site 1 with all tractor units T1–T6 off the site 1 and off plastic liner 1a. Discharge unit 14 is moved to the distal end portion 8 of conveyor 4 with spreader 18 in line over the distal length line of site 1. Mobile loader 21 feeds sand from mound S1 to mobile hopper 22 which supplies sand to conveyor feed hopper 24. The operator from the position of control center 20, starts the lateral conveyor 16, starts the auger drive motor (not shown) of the spreader 18, starts the drive motor 36 of the elongated main conveyor 4 and opens a gate on feed hopper 24 to permit a controlled flow of sand to drop onto conveyor 4 and begin traveling toward distal end portion 8 of conveyor 4. The operator also starts the drive motors for mobile discharge unit 14 and spreader 18. When sand reaches the mobile discharge unit 14, it is elevated and discharged or dumped onto lateral conveyor 16 which conveys the sand to spreader 18. At this time, the operator begins the travel of mobile discharge unit 14 in the direction of arrow 12. As conveyors 4 and 16 are operated simultaneously with the movement of discharge unit 14, it can readily be appreciated that conveyor 16 and spreader 18 will continuously deposit and spread a layer of sand along a first elongated strip A of site 1 adjacent to conveyor 4. The depth of the sand layer is principally controlled by the speed of discharge unit 14 and the rate of sand feed to spreader 18. After discharge unit 14 has traveled the entire width W of site 1 between distal end portion 8 and proximate end portion 6 of conveyor 4, the operator closes the feed gate of feed hopper 24 and allows the conveyors to empty of sand. It is preferred that the operator then returns discharge unit 14 to its distal position over distal end portion 8 of conveyor 4; however, if desired, the operator may leave discharge unit 14 at the proximate end portion 6 to begin the next pass in the opposite direction. In any event, the operator activates the tractor units T1–T6 to move the entire conveyor system 2 laterally upon the layer of sand now on strip A to a point where spreader 18 will be positioned to spread another strip B of sand contiguous with strip A. It is noted that at this point, tractor units T2, T3, T4 and T5 will be positioned fully upon the sand layer of strip A while units T1 and T6 will remain outside the bounds of site 1 and off of line 1a. It is possible for all tractor units T1–T6 to be positioned upon the sand layer of strip A. In this manner, no tractor unit ever treads upon a portion of site 1 or liner 1a which has not first been covered with sand. After conveyor system 2 is in the aforementioned position, the process described above is repeated to deposit and spread a layer of sand along strip B. The process is then again repeated to deposit strip C as is being shown in FIG. 1, and the process is continued until sand mounds S1, S2, etc. are depleted and the sand thereof approximately evenly distributed over site 1 and liner 1a.

FIGS. 2 and 3 present a more detailed view of conveyor system 2 and depict another preferred embodiment of the apparatus of the present invention. The apparatus of FIG. 2 has eliminated mobile loader 21 and mobile hopper 22 of FIG. 1 and has substituted therefor an hydraulic excavator 26 which can transport sand from mounds S1, S2, or preferably from a windrow or continuous line of stockpiled sand, directly into feed hopper 24. FIG. 2 more clearly shows that conveyor 4 includes an endless belt 28 which rests upon and rides over a plurality of idlers 30 mounted upon interconnected truss frames 32a, 32b, 32c, 32d, 32e secured to one another preferably, but not necessarily, at tractor units T2, T3, T4 and T5, respectively. It is noted that standard conveyor truss frames may be about eighteen feet long while it is contemplated that the distance between tractor units may be about fifty to seventy feet. Each tractor unit may carry a support plate 33 which is mounted to pivot about a horizontal axis 35 parallel to the direction of lateral movement, that of arrow 10 in FIG. 1 This construction, while not necessary for all conveyor/tractor unit connections, permits the use of the system 2 on terrain with a small degree of slope. In order to operate the system on more hilly terrain truss sections between the tractor units may also be secured together on horizontal pivot axes P1-P4 of which only pivot points P1 and P4 are shown in FIG. 2. It is also noted that on very irregular terrain horizontal pivot axes 35 may be replaced with a ball and socket type pivoting mount represented by P1'-P7' in FIG. 7. On relatively flat terrain the conveyor truss will flex enough to eliminate the need for pivot connections P1-P4.

It is noted that at the feed end 6 of conveyor 4 idlers 30 are much closer together in order to support the weight of the sand pouring from feed hopper 24. FIGS. 2 and 3 also depict tractor units T1-T6 as each including two side treads 34a, 34b, each of which is individually controllable in a well known manner by the operator, in order to permit adjustment of any misalignment of conveyor 4 which may occur during lateral transport of the conveyor.

FIG. 3 depicts an embodiment of the invention where no spreader 18 is utilized. In this case the sand is deposited to site 1 upon liner 1a directly by lateral conveyor 16. Thereafter, a separate mobile spreader (not shown) easily works the deposited line of sand into a level layer of desired depth. It is important that the mobile spreader work only on deposited sand and not touch liner 1a. FIG. 3 also shows main conveyor motor 36 which drives distal end conveyor pulley 38, thus pulling sand on conveyor 4 toward distal end 8 of conveyor 4.

With reference to FIGS. 4 and 5, there is shown alternative embodiments of mobile discharge unit 14 and depositing unit 16 in greater detail. FIG. 4 shows a tractor unit, for example, T5 carrying conveyor span 32e upon which rides the drive wheels 40a, 40b of mobile discharge unit 14. Discharge unit 14 is shown to have a funnel hopper 42 into which sand is dumped from the high point 28h of belt 28. Sand is then directed from hopper 42 onto lateral conveyor 16 which deposits the sand into loading tube 44 of spreader 18 Spreader 18 spreads sand onto the site evenly across the length thereof. While spreader 18 is shown with wheels 46a, 46b which can turn ninety degrees for lateral movement, it is noted that since it is more desireable not to run wheels over liner 1a, spreader 18 may be suspended above liner 1a from discharge unit 14 or eliminated altogher as explained above. It is also possible that spreader 18 may be carried and propelled by a separate track vehicle 47, such as a crawler loader, running independently over the sand layer adjacent conveyor 4 following the movement of mobile discharge unit 14, as depicted in FIG. 7.

FIG. 5 shows an alternative embodiment wherein lateral conveyor 16 has been substituted by a gravity chute 16a and spreader 18 has been eliminated. According to this embodiment, sand dumped from the high point 28h of conveyor belt 28 passing through discharge unit 14a impinges directly upon chute 16a and is deposited directly upon liner 1a. A chain 48 connected to chute 16a may be used by the operator to change the slope of chute 16a and thus change the rate of deposit.

FIG. 6 shows the terrain layers of a typical solid waste land fill. Over the existing soil into which a longitudinal trench 50 is dug, there is first deposited about a three foot layer of clay 52. Into the trench 54 over clay 52 there is positioned longitudinally extending perforated pipe 56 surrounded by rock 58. Over the rock 58 is laid a fabric filter 60 and thereover deposited about twelve inches of sand 62. Over sand layer 62 is deposited another two feet of clay 64 having trench 66. Over clay 64 is laid high density polyethylene liner 1a. Then another longitudinally extending perforated pipe 68 surrounded by rock 70 and fabric filter 71 is placed over liner 1a in trench 66. It is at this point that the critical sand layer S is laid over liner 1a. Upon sand S will be deposited first a select refuse layer 72 and then general refuse layer 74 thereover. As liner 1a is laid at a two percent slope toward trench 66, it can be seen that any liquid leachate draining onto liner 1a will flow toward and into pipe 68 whereafter it is recovered and disposed of properly. If leachate should make its way through liner 1a, it will flow down into what is known as the witness zone and into pipe 56. Leachate recovered from pipe 56 is an indication of a malfunction of the land fill site antipollution protection measures, and corrective measures should then be taken.

FIG. 7 indicates that conveyor 4 can be assembled with virtually any number of conveyor frame spans 32 positioned between tractor units T1-T7. In the preferred embodiments each conveyor span is fifty to seventy-five feet long. Due to the provision of pivot joints P1-P7 conveyor system 2 is capable of spreading aggregate over large areas of land even where the terrain is uneven and contains crevices which must be spanned.

It can readily be seen that the novel method and apparatus described hereinabove achieve the objects and obtains the advantages set forth hereinabove. Inasmuch as numerous modifications may be made to the specifically described preferred embodiments of the invention without departing from the spirit and scope thereof, the scope of the invention is to be determined solely by the language of the following claims as interpretted by the patent laws and particularly the doctrine of equivalents.

What is claimed is:

1. A method of depositing a layer of aggregate material over an area, comprising the steps of:
   laying down a liner over an area, which liner may be damaged by direct contact with heavy machinery;
   supplying aggregate material to one end portion of an elongated conveyor;

conveying aggregate material from said one end portion along the elongated conveyor;

discharging aggregate material from the elongated conveyor at multiple locations along the length of the elongated conveyor;

depositing and spreading the aggregate material upon a portion of the liner adjacent the elongated conveyor to a desired depth to produce an elongated liner strip having a deposited layer of aggregate material thereon;

moving the elongated conveyor laterally onto such deposited layer of aggregate material on such elongated liner strip; and repeating the previously mentioned strips of supplying, conveying, discharging, depositing and spreading, and moving, until the liner is covered by a layer of deposited aggregate material, whereby no heavy machinery directly contacts the liner.

2. The method as specified in claim 1 wherein:
said conveying is accomplished upon an endless belt conveyor.

3. The method as specified in claim 2 wherein:
said discharging includes the steps of;
causing said endless belt conveyor to run through a discharge unit having an elevated belt portion; and
dumping aggregate material from said elevated belt portion.

4. The method as specified in claim 3 wherein:
said depositing includes the additional step of conveying aggregate material dumped from said elevated belt portion laterally away from said endless belt conveyor.

5. The method as specified in claim 4 wherein:
said conveying dumped aggregate material is accomplished at least in part by a second endless belt conveyor.

6. The method as specified in claim 4 wherein:
said conveying dumped aggregate material is accomplished at least in part by a gravity chute.

7. The method as specified in claim 4 wherein:
said conveying dumped aggregate material is conveyed in the same lateral direction as said moving the elongated conveyor.

8. The method as specified in claim 3 wherein:
said discharge unit is movable to any location along said endless belt conveyor between the end portions thereof to permit said discharging at infinitely variable locations and movement of said discharge unit being accomplished simultaneously with said conveying.

9. The method as specified in claim 8 wherein:
said discharging is accomplished simultaneously while said discharge unit is moving along said endless belt conveyor.

10. The method as specified in claim 1 wherein:
said steps of conveying, discharging and depositing may be performed continuously and simultaneously.

11. The method as specified in claim 1 wherein:
said steps of discharging and depositing and spreading are performed simultaneously.

12. The method as specified in claim 1 wherein:
said spreading is accomplished subsequent to said discharging.

13. The method as specified in claim 1 wherein said discharging is from infinitely variable locations along the length of the elongated conveyor.

14. A method of depositing a layer of aggregate material over a new land fill site having a leachate recovery system, said leachate recovery system including a liquid impermeable liner over which said aggregate is to be deposited, including the steps of:

laying down a liner over an area, which liner may be damaged by direct contact with heavy machinery;

assembling a conveyor along and adjacent one edge of such liner;

supplying aggregate material to one end portion of said conveyor;

conveying aggregate material from said one end portion along the elongated conveyor;

discharging aggregate material from said elongated conveyor at multiple locations along the length of the elongated conveyor;

depositing and spreading the aggregate material upon a portion of the area of said liner adjacent the elongated conveyor to a desired depth to produce an elongated area strip on such liner having a deposited layer of aggregate material thereon;

moving the elongated conveyor laterally onto such area strip; and repeating the previously mentioned steps of supplying, conveying, discharging, depositing and spreading, and moving, until substantially the entire liner is covered by a layer of aggregate material.

15. The method as specified in claim 14 and further comprising the step of:
said assembling including spanning said conveyor between at least two separate tractor units used for said moving.

16. The method as specified in claim 14 and further comprising the step of:
said assembling including spanning said conveyor between at least three separate tractor units used for said moving.

17. The method as specified in claim 16 wherein:
said tractor units are individually movable.

18. The method of depositing a layer of aggregate material over a new land fill site having a leachate recovery system, said leachate recovery system including a liquid impermeable liner over which said aggregate is to be deposited, including the steps of:

laying down a liner over an area, which liner may be damaged by direct contact with heavy machinery;

assembling a conveyor along and adjacent one edge of such liner;

supplying aggregate material to one end portion of said conveyor;

conveying aggregate material from said one end portion along the conveyor;

discharging aggregate material from said conveyor at selected locations along the length of the conveyor;

depositing and spreading the aggregate material upon a portion of the area of said liner adjacent the conveyor to a desired depth to produce a strip on such liner having a deposited layer of aggregate material thereon;

moving the conveyor laterally onto such strip; and repeating the previously mentioned steps of supplying, conveying, discharging, depositing and spreading, and moving, until substantially the entire liner is covered by a layer of aggregate material.

* * * * *